United States Patent [19]

Menegoli

[11] Patent Number: 5,504,402
[45] Date of Patent: Apr. 2, 1996

[54] BEMF RECTIFICATION VOLTAGE WHEN POWER SUPPLY ENERGY FAILS

[75] Inventor: Paolo Menegoli, Milpitas, Calif.

[73] Assignee: SGS-THOMSON Microelectronics, Inc., Carrollton, Tex.

[21] Appl. No.: 425,211

[22] Filed: Apr. 18, 1995

Related U.S. Application Data

[63] Continuation of Ser. No. 80,963, Jun. 22, 1993, abandoned.

[51] Int. Cl.$^6$ ........................................................ H02P 3/14
[52] U.S. Cl. ............................................ 318/377; 318/368
[58] Field of Search ................................... 360/105, 107; 318/377, 368, 138, 254, 439

[56] References Cited

U.S. PATENT DOCUMENTS

| | | | |
|---|---|---|---|
| 3,541,416 | 11/1971 | Woyton | 318/331 |
| 3,965,404 | 6/1976 | Petersen | 318/377 |
| 4,371,903 | 2/1983 | Lewis | 360/75 |
| 4,647,997 | 3/1993 | Westwood | 360/105 |
| 4,658,308 | 4/1987 | Sander, Jr. | 360/74.1 |
| 4,679,102 | 7/1987 | Wevers et al. | 360/75 |
| 4,692,829 | 9/1987 | Campbell | 360/105 |
| 4,716,514 | 12/1987 | Patel | 363/127 |
| 4,866,554 | 9/1989 | Stupeck et al. | 360/105 |
| 4,870,555 | 9/1989 | White | 363/21 |
| 4,914,316 | 4/1990 | Rossi et al. | 307/246 |
| 4,914,644 | 4/1990 | Chen et al. | 369/43 |
| 5,091,680 | 2/1992 | Palm | 318/368 |
| 5,124,867 | 6/1992 | Kitahori et al. | 360/105 |
| 5,172,036 | 12/1992 | Cameron | 318/138 |
| 5,311,069 | 5/1994 | Austin | 318/377 |

Primary Examiner—William M. Shoop, Jr.
Assistant Examiner—Karen Masih
Attorney, Agent, or Firm—Richard A. Bachand; Rodney M. Anderson; Lisa K. Jorgenson

[57] ABSTRACT

In a disk drive, the read-write heads of the disk drive should be parked during a power failure. The kinetic energy of the spinning rotor is used to move the head away from the disk's surface. A high voltage is produce from the low voltage spindle motor by using a BEMF voltage to step up the voltage in a voltage supply capacitor to a higher voltage by enabling or disabling a switch connected to a comparator. When the switch is turned on, it shorts the rectified voltage in the stator windings to ground in order provide a current path for a current formed in the coils by the BEMF. When the current reaches a predetermined level, the switch is turned off. The current flows through the voltage supply capacitor so that its voltage is "kicked-up" by the inductance of the windings and by the BEMF still present in the stator windings. This increased voltage is used to park the heads and to brake the motion of the spindle. Two control feedback loops are used to more efficiently enable the voltage conversion. A current comparator compares the current in coils to a reference current and turns the switch off when the current is at a predetermined level. A voltage comparator compares the voltage across the load with a reference voltage and turns the switch off when the voltage is above a predetermined value.

17 Claims, 2 Drawing Sheets

BEMF RECTIFICATION VOLTAGE WHEN POWER SUPPLY ENERGY FAILS

The present application is a continuation of application Ser. No. 08/080,963, filed Jun. 22, 1993, now abandoned.

BACKGROUND OF THE INVENTION

1. Field of the Invention

This invention relates to improvements in utilizing the back EMF generated by a coasting spindle motor. More particularly, this invention uses the back EMF voltage generated to park the head of a driver.

2. Description of the Related Art

Although the invention pertains to polyphase DC motors, in general it is useful with any brushless and sensorless motor. These motors are used to rotate data media, such as hard disk drives, CD ROM drives, floppy disks and other computer related applications.

These motors are typically thought of as having a stator with three coils connected in a "Y" configuration. In actual systems, a large number of stator coils are usually employed with multiple motor poles. In operation, the coils are selectively energized to establish a current path through two coils of the coils forming a "Y" configuration, leaving the third coil to float. Another method sequentially energizes one coil at a time by having a current path through a single coil to a center tap. In either case, a sequence of energized coils is arranged so that as the current paths are changed, or commutated, at least one of the coils used to form the current path becomes a floating coil in the next sequence.

For a three phase DC motor, there are six transistors which control the three stator coils. There are three upper CMOS transistors that connect the coils to a power supply and three lower CMOS transistors that connect the coils to ground. A sequencer generates signals which turn the CMOS transistors on and off in order to change the magnetic field within the stator windings.

These polyphase DC motors are used in hard disk drives. A disk of the disk drive is rotated in a angular direction at a speed provided by the moving rotor (spindle) of the motor. A typical disk has a suitable magnetic material provided on either one (a one-sided disk) or both sides (two-sided disk). The disk is spun by the spindle of the motor. A read-write head, also called the transducer head, engages the magnetic surface of the disk. If the disk has magnetic material on both sides, then two read-write heads are used. A positioner motor moves the read-write head in a radial direction across the disk. The read-write head reads or writes data to the disk. The data is stored on the disk in annular tracks of the magnetic material. The positioner motor typically has a coil (inductor) mounted with a magnetic field. The positioner motor moves the read-write head in the radial direction from points over the disk to a point away from the surface of the disk.

In response to the control signals from the computer, the positioner motor positions the read-write heads over the annular tracks. The disk is spun at a sufficient speed in order to create a film of air which the read-write heads ride on. This prevents the read-write heads from contacting the disk surface which could possibly damage the disk or the read-write heads. The heads are typically designed to actually fly above the disk recording surfaces at heights of less than 50 micro-inches.

If there is a power failure, the disk will begin to slow down and the film of air will subsequently disappear. If the transducer head is still above the disk when this occurs, then irreparable damage can result. Therefore, the read-write head must be withdrawn from the vicinity of the disk before the disk's speed is substantially reduced. In order to "park" the read-write head, the positioner motor must operate when the power supply has failed. Although loss of the power is probably the primary reason for moving the read-write head away from the disk, the procedure is typically also initiated when the disk speed does not remain within tolerance, positioner error is detected, or write circuit faults that could affect stored data are detected.

Upon the detection of a power supply failure, a relay or an equivalent switching means switches a capacitor across a positioner coil terminal to provide the electro-motive force necessary to move the head support structure across the disk surfaces. Near the outer edge of the disk, the read-write head may be supported by a ramp to completely remove the head from the disk.

A rotating magnetic DC motor has kinetic energy stored in the rotating spindle mass. This energy can be used to provide the power required to park the read-write head. In normal operation, the rotating magnetic DC motor is used to drive the spindle. Under a head-parking procedure, the motor stator windings are switched directly to the linear motor positioner coil and the DC motor is converted to a generator to supply the head retract energy. This method utilizes the BEMF generated by the coasting spindle motor. The BEMF is rectified and charges a capacitor which supplies power to the voice coil motor (VCM) in order to "park" the read-write head. Then the driver of the spindle motor control circuitry can short the three phases of the spindle motor in order to "brake" the speed of the disk.

In previous disk drives, the kinetic energy in the stator winding was high enough to run the VCM directly. Due to the progressive size reduction of hard disk drives, the mass of the spindle motors is reduced along with the power supply voltage that is necessary to drive the disk drives. Therefore, the BEMF signal generated by the windings is insufficient in such new disk drives to charge the capacitor. For example, a 3.3 volt application system of the BEMF signal amplitude is generally lower than 3 volts even at full speed (high RPM).

SUMMARY OF THE INVENTION

The invention generates a high voltage out of the BEMF signal in order to make the operations of the "park" and "brake" possible in any condition and with any low voltage spindle motor. By turning on the spindle drivers synchronously, the BEMF signal in each phase can be maximized and thereby reduce the voltage drop and dissipation. This is particularly critical when synchronous rectification is required because of the minimum voltage amplitude necessary to keep the circuitry alive. This is accomplished by stepping up the BEMF voltage to a higher voltage by enabling or disabling a switch coupled to a comparator. The switch shorts the rectified voltage to ground when it is turned on (forcing a certain current in the coils). The voltage is "kicked-up" by the inductance of the windings and by the BEMF signals still present when the switch is turned off. The current, through a diode, charges the capacitor that acts as a filter to supply energy to the VCM.

The invention uses two control feedback loops to improve the voltage conversion efficiency. The current in the switch (and in the coils) can be controlled by determining the turn-on time of the switch. The amplitude of the rectified voltage can also be controlled by determining the turn-off time of the switch. The current comparator compares a pre-set voltage threshold, which is supplied by a reference voltage, with the voltage from a sensing resistor in series with the switch. Since the current in the switch is the same as the current in the coils when the switch is on, this determines a maximum current threshold. When the current rises above the maximum current threshold, the switch is turned off. The level of the current along with the inductance value of the windings determines the voltage "kick".

A voltage comparator compares a pre-set voltage, which is supplied by the reference voltage, with the filtered voltage across the capacitor. If the voltage is too high (above the fixed threshold), the comparator keeps the switch in the off position until the load discharges the capacitor to a level below the comparator threshold. The signals from the two comparators are output to a pre-set driver which drives the switch.

BRIEF DESCRIPTION OF THE DRAWINGS

The invention is illustrated in the accompanying drawing, in which like reference numerals are used to denote like or similar parts, and wherein.

DETAILED DESCRIPTION FOR PREFERRED EMBODIMENTS

Figure 1:
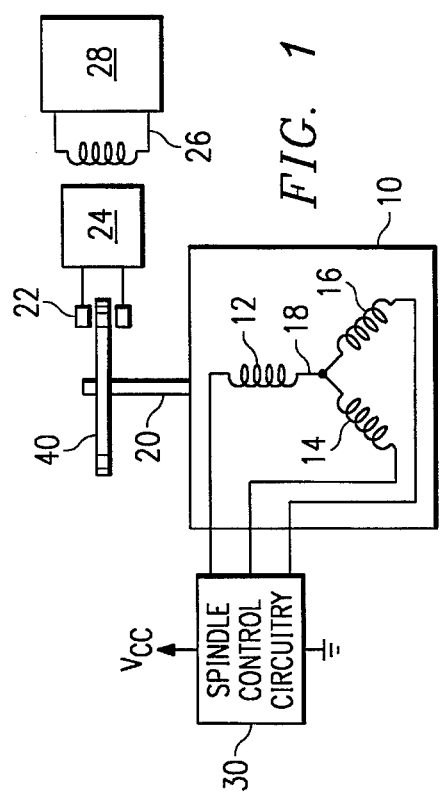
FIG. 1 is a diagram of a magnetic storage system showing a spindle motor and controller.

FIG. 1 shows a disk drive system. The spindle control circuitry 30 is connected to power and ground. A sequencer (not shown), which is part of the spindle control circuitry 30, generates signals which control the stator coils of the polyphase DC motor 10. Each stator coil 12, 14 and 16 creates a magnetic field whose vector is changing direction in a sequential manner (clockwise or counter-clockwise). The magnetic field induces the magnetic rotor (not shown), which is attached to the spindle 20, to turn in the specified direction. The angular speed of the spindle 20 is controlled by the speed at which magnetic fields in the stator windings 12, 14 and 16 are changed. The center tap 18 can be connected as part of the current path or simply serve as a voltage sensor to sense the voltage across each stator coil.

A disk 40 of the disk drive is attached to the spindle 20. As the disk 40 is spun in an angular direction, the read-write heads 22 move radially across the disk's surface. The rotation of the spindle and the disk causes an air cushion between the disk and the head, i.e., the head is floating on the disk. The read-write heads 22 are supported by a head support 24. A read-write head position control 28 energizes the inductor coil 26 to control the radial position of the heads relative to the disk 40.

Figure 2:
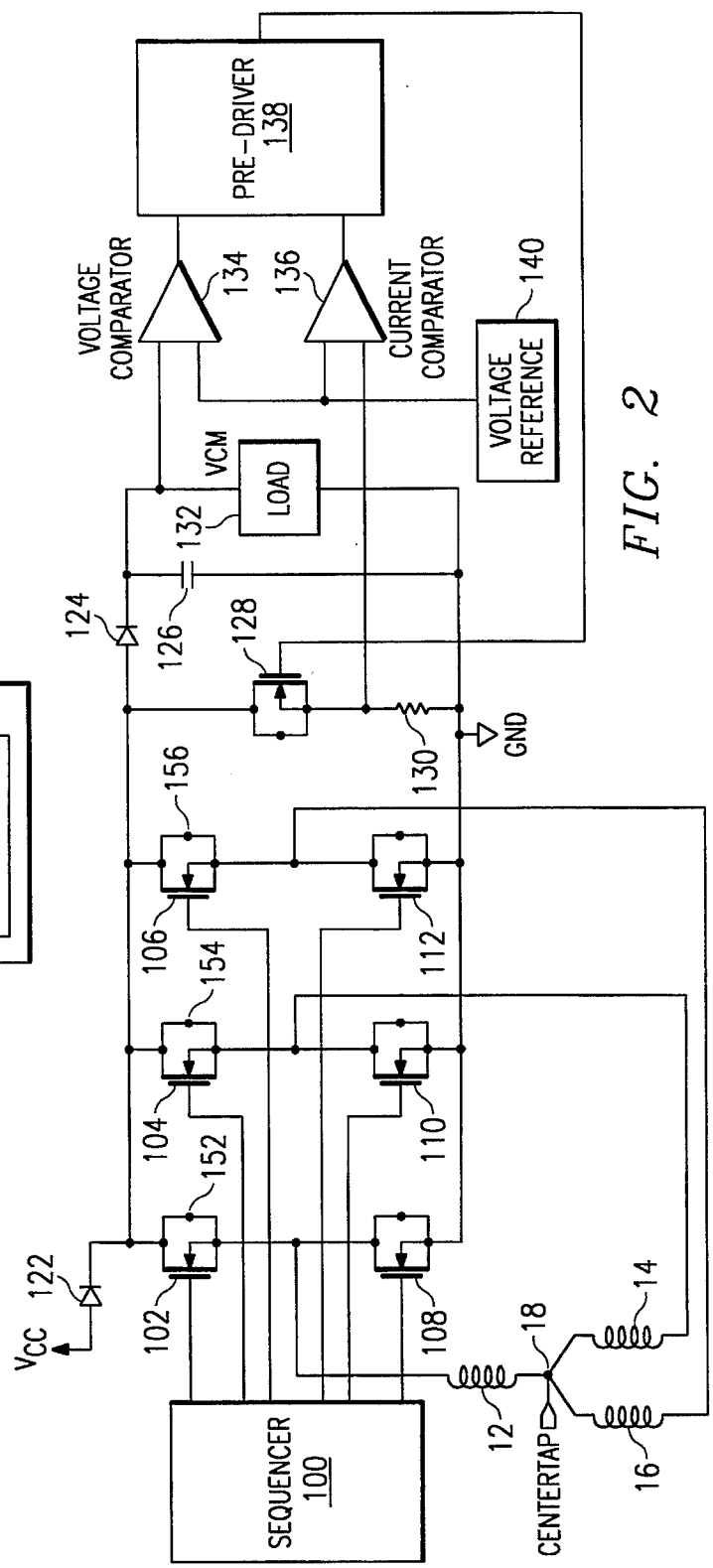
FIG. 2 is a schematic diagram of the invention.

FIG. 2 is a schematic diagram showing the control circuitry for parking the read-write heads during a power supply shut-down. While FIG. 2 shows a three coil winding embodiment, one skilled in the art will understand that control circuitry can be extended for a polyphase DC motor.

The sequencer 100 generates six signals for controlling the stator windings 12, 14 and 16. Signals are sent to each of the three upper switches 102, 104 and 106 and each of the three lower switches 108, 110 and 112. In the preferred embodiment, each of these switches 102–112 are CMOS transistors.

The three upper switches 102, 104 and 106 connect the corresponding stator coil 12, 14 and 16 to power. For example, when switch 102 is closed, stator coil 12 is connected to power. In the same manner, switch 104 connects stator coil 14 to power and switch 106 connects stator coil 16 to power. Each of the lower switches 108, 110, and 112 connect the corresponding stator coil 12, 14 and 16 to ground (or a low potential). For example, when switch 108 is closed, stator coil 12 is connected to ground. In the same manner, switch 110 connects stator coil 14 to ground, and switch 112 connects coil 16 to ground. A diode 122 is connected between power and the upper switches 102, 104 and 106 to restrict the current to flow from the power supply to the stator coils.

During normal operation, one upper switch 102, 104 or 106 and one lower switch 108, 110 or 112 are selected to form a current path between $V_{cc}$ and ground. As current flows through the selected coils, a magnetic field is produced. For example, the sequencer may close switches 102 and 110 by providing logic high signals to the gates of the CMOS transistors 102 and 110 in order to turn the CMOS transistors on. Current then flows from power, through diode 122, switch 102, stator coil 12, stator coil 14, and switch 110 to ground. A magnetic field is created in the stator coils 12 and 14. The sequencer 100 then commutates to the next sequence of coils to switch on switches 102 and 112. Thus, the current from $V_{cc}$ now flows through stator coils 12 and 16. The magnetic fields created in stator coils 12 and 16 have different orientations than the fields created when the current flows through coils 12 and 14. Thus, a moment is created between the magnetic fields in the energized coils and the fields of the permanent magnetic in the rotor, causing the rotor to move. As the magnetic flux has been moved in the clockwise direction, the rotor and the attached spindle will move in a clockwise direction following that flux.

Another method uses a single stator coil connected between power and ground through the center tap. The magnetic field is produced in one winding at a time. By sequencing through each winding, a changing magnetic field is created similarly to the previous method.

FIG. 2 also shows the control circuitry activated during a power supply failure. A switch 128 is connected in series with a sense resistor 130 between power (through diode 122) and ground. This circuit is connected in parallel with a second diode 124, which is connected in series with a capacitor 126 to ground. The diode 124 prevents the capacitor 126 from discharging through the switch 128.

A load 132 is connected in parallel with the capacitor 126. Preferably, the load 132 is a voice coil motor (VCM); however the load 132 can be any device that can retract the heads. The voltage across the capacitor 126 powers the load 132 during parking of the read-write heads. The load 132 ensures that the heads are retracted from the disk before the disk has significantly slowed down.

The switch 128 is controlled by a pre-driver 138. The pre-driver 138 is formed from logic circuits such as NAND and NOR gates. The switch 128 in this preferred embodiment is a n-channel MOS transistor. A voltage comparator 134 has the inverting input connected to the input of the load and a non-inverting input connected to a voltage reference 140. The voltage reference is preferably the band gap signal provided on the chip and powered by the capacitor 126 during the power failure. A current comparator 136 has a inverting input connected to the upstream side of the sense resistor 130 and a non-inverting input connected to the voltage reference 140. The output of the voltage comparator 134 and the current comparator 136 are inputs to the pre-driver 138. The output of the pre-driver 138 controls the switch 128. In this preferred embodiment, the output of the pre-driver 138 is connected to the gate of the CMOS transistor 128.

In normal operation, the power supply charges the capacitor 126 to $V_{cc}$ minus the voltage drop across diodes 122 and 124. The switch 128 is held open by the pre-driver 138, i.e., the CMOS transistor is off. When the power supply is abruptly removed, the sequencer 100 ceases generating signals, and therefore, the three upper switches 102, 104, 106 and the three lower switches 108, 110, 112 open (i.e., they switch to or remain in the off state). The spindle and the rotor continue to spin due to the momentum of the disk. The permanent magnetic field of the rotor magnet induces a BEMF in the stator coils 12, 14 and 16. The voltage induced across each coil is large enough to overcome the voltage drop across the intrinsic diodes 152, 154 and 156 of each of the upper switches 102, 104, and 106, respectively. Diode 122 inhibits the current from dissipating through the ground potential of the power supply. Therefore, the only remaining current paths are through the switch 128 and the capacitor 126.

The pre-driver 138 turns the switch 128 on, allowing a BEMF current produced by the BEMF in the stator coil to flow through the intrinsic diode 152, 154 and 156. The BEMF current flows through the switch 128 and the sense resistor 130 to ground. In other words, the switch shorts the rectified voltage to ground when it is turned on in order to produce a current in the coils. The pre-driver 138 then changes the switch 128 to the open state. The current in the stator coil can not be instantly changed, therefore the BEMF current flows through diode 124 and charges capacitor 126. This BEMF current increases the potential across the capacitor 126 and essentially the voltage of the capacitor is "kicked up" by the inductance of the stator coil and by the BEMF still present when the switch 128 was turned off. This BEMF current charges the capacitor 126 which acts as a filter to supply energy to the load.

In order to more accurately control the switch 128, two feedback loops are used. The BEMF current in the switch (and in the stator coils) can be controlled by determining the turn on time. The amplitude of the rectified voltage can also be controlled by determining the turn off time of the switch 128. The current comparator 136 compares the voltage threshold from the voltage reference 140 with the voltage across the sensing resistor 130. Because the BEMF current in the switch 128 is the same as the BEMF current in the stator coils when the switch 128 is on, the sensing resistor 130 determines a current threshold above which the switch should be turned off. The level of the BEMF current along with the inductance value of the windings determines the voltage "kick."

The voltage comparator 134 compares a pre-set voltage, which is provided by the voltage reference 140, with the filtered voltage used to supply the load 132. If the voltage is too high, i.e., above the fixed threshold, the voltage comparator 134 keeps the switch 128 off until the load 132 discharges the capacitor 126 to a voltage level below the fixed threshold of the voltage comparator 134. The output of the voltage comparator 134 is used to generate the signal generated by the pre-driver 138.

The rectifying action of the intrinsic diodes of switches 102, 104 and 106, which are either CMOS or DMOS technology, is guaranteed as long as the BEMF signal amplitude is higher than two voltage diode drops (1.2 to 1.4 volts). This limitation can be overcome by supplying some of the filtered voltage to the sequencer so that the sequencer signals to the switches 102, 104 and 106 are continued. A synchronous rectification sequence would be used to avoid losing the BEMF signal when the switch is turned off.

If the "brake phase" starts during the BEMF step up process while the main priority is the "parking", a problem could exist. If the step up voltage conversion removes kinetic energy from the spindle too quickly, the read-write head may not be able to "fly" to the parking position. Therefore, the step up action is disabled when the rotational speed of the spindle motor falls below a predetermined threshold.

The stepping up of the BEMF voltage has the side effect of slowing the rotational speed of the spindle a little by transferring the energy from the spindle to the load. Therefore, the more energy needed to park the head, the stronger effect of braking the spindle motor. This has the advantage of causing the brake phase to not last a long time (short coasting.)

Figure 3:
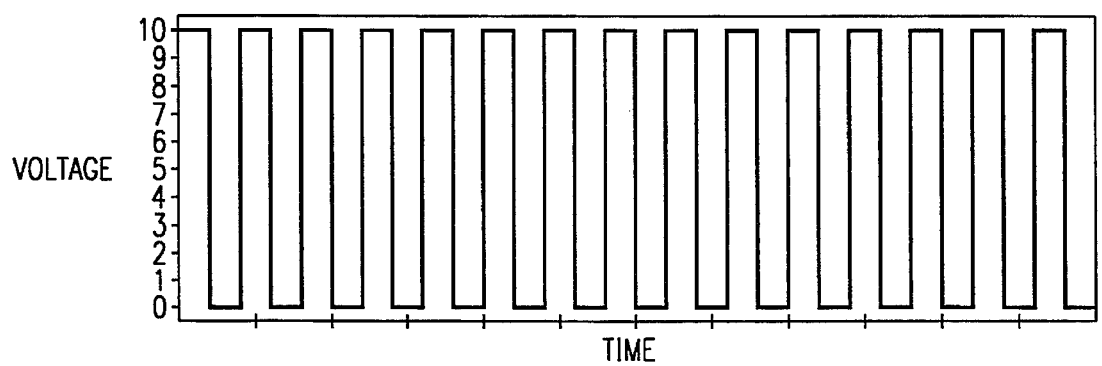
FIG. 3 is a graph of the voltage applied to the switch in the preferred embodiment.
Figure 4:
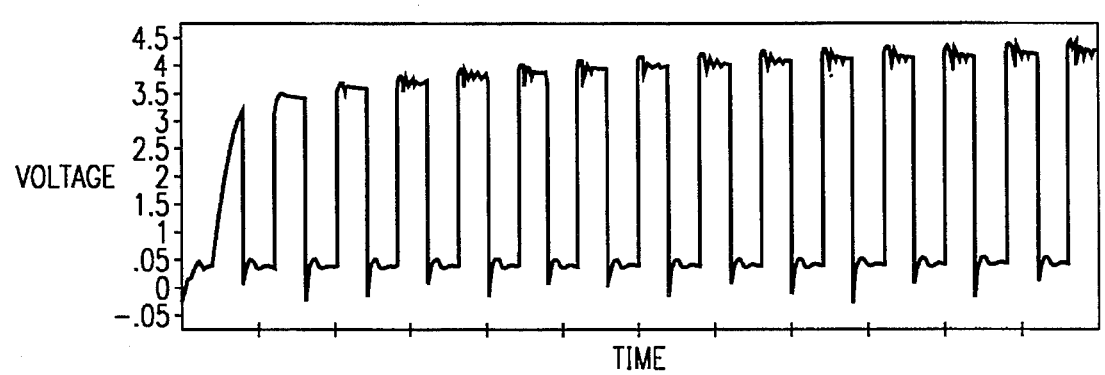
FIG. 4 is a graph of the voltage in the stator windings.
Figure 5:
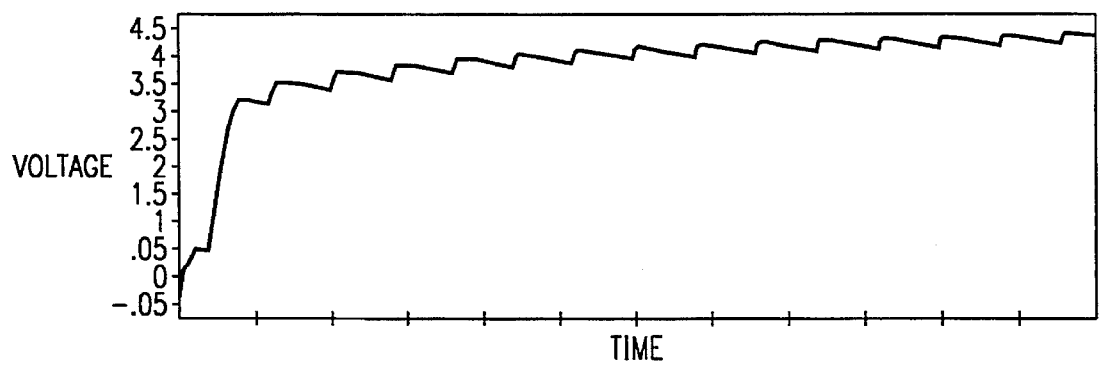
FIG. 5 is a graph of the voltage across the capacitor.

FIGS. 3–5 show the change in voltage in three parts of the circuit. In FIG. 3, the signal from the pre-driver 138 is shown. When the voltage is high, the switch 128 is turned on (a n-channel MOS transistor is on when a high voltage is applied to the gate.) In FIG. 4, the BEMF voltage induced in the stator windings 12, 14 and 16 is shown. When the switch is on, the current flows through the stator windings causing the induced voltage in the windings. In FIG. 5, the voltage across the capacitor 126 is shown. The voltage is stepped up due to the switch 128 being turned on and off.

Although the invention has been described and illustrated with particularity, it is intended to be illustrative of the preferred embodiment. It is understood that the disclosure has been made by way of example only. Numerous changes in the combination and arrangements of the parts, steps, and features can be made by those skilled in the art without departing from the spirit and scope of the invention, as hereinafter claimed.

What is claimed is:

1. A motor driver circuit, capable of applying an increased load voltage to a load when an interruption in a primary power supply occurs, the increased load voltage being produced from a BEMF of the windings of a polyphase motor, comprising:

a plurality of driver transistors, each having a conduction path coupled between a power supply node and an associated winding of the polyphase motor, and having a control electrode driven according to a commutation sequence;

load voltage storage means, coupled to the power supply node, for storing a load voltage and for applying the load voltage to the load;

switch means, coupled to the power supply node, coupled across the load voltage storage means, and having a control electrode, for selectively shunting a current produced from the BEMF generated by a coasting rotor of the polyphase motor from being applied to the load voltage storage means; and control means, coupled to the control electrode of the switch means, for opening the switch means responsive to a current passing through the switch means exceeding a threshold value, so that the current is applied to the load voltage storage means in such a manner that the load voltage is increased.

2. The motor driver circuit according to claim 1, wherein the load voltage storage means comprises a capacitor.

3. The motor driver circuit according to claim 1, wherein the switch means comprises:

an MOS transistor having a source/drain path, and having a gate coupled to the controlling means; and a resistor, connected in series with the source/drain path of the MOS transistor;

and wherein the series combination of the source/drain path of the MOS transistor and the resistor is connected in parallel with the load voltage storage means, and with the plurality of driver transistors.

4. The motor driver circuit according to claim 3, wherein the controlling means comprises:

a first comparator for comparing the load voltage and a reference voltage;

a second comparator for comparing the voltage across the resistor and a current limit threshold voltage; and a logic circuit generating a switch control signal, at an output coupled to the gate of the MOS transistor, responsive to the first comparator the second comparator.

5. The motor driver circuit according to claim 4, wherein the reference voltage and the current limit threshold voltage are the same.

6. The motor driver circuit of claim 1, further comprising:

a diode having an anode coupled to the power supply node and having a cathode connected to the load voltage storage means.

7. The motor driver circuit of claim 1, wherein each of the plurality of driver transistors is a MOS transistor;

wherein the control electrodes of each of the plurality of drive transistors are biased to an off state responsive to an interruption in the primary power supply;

and wherein the current produced from the BEMF generated by the coasting rotor of the polyphase motor is conducted through at least one of the plurality of drive transistors in the off state.

8. The disk drive system of claim 10, further comprising:

a diode, having an anode coupled to the power supply node and a cathode coupled to the capacitor.

9. The disk drive system of claim 10, wherein each of the plurality of driver transistors is a MOS transistor;

and wherein the induced current is conducted by at least one of the plurality of driver transistors from its associated stator winding to the power supply node.

10. A disk drive system, comprising:

a polyphase motor, having a plurality of stator windings, and connected to a spindle for rotatably spinning at least one disk;

a head assembly having at least one read-write head cooperating with the at least one disk and being positioned by a head positioning device;

a retracting head device powered by a load voltage;

a plurality of driver transistors, each having a conduction path coupled between a power supply node that is coupled to the power supply voltage and an associated one of the plurality of stator windings, and each having a control electrode;

a sequencer, having a plurality of outputs, each coupled to one of the plurality of driver transistors, for controlling the driver transistors according to a commutation sequence, and for turning off all of the plurality of driver transistors responsive to loss of the power supply voltage;

a capacitor, coupled to the retracting head device, for storing the load voltage;

a shunt switch circuit, coupled to the power supply node and coupled across the capacitor, for selectively shunting an induced current produced from a BEMF generated in the stator windings of the motor and conducted through at least one of the plurality of driver transistors from being applied to the capacitor; and a control circuit for producing a switch control signal to the shunt circuit responsive to a shunt current passing through the shunt switch circuit so as to open the shunt circuit, so that the induced current charges the capacitor to an increased load voltage.

11. The disk drive system of claim 10, wherein the shunt switch circuit comprises:

an MOS transistor having a source/drain path; and a resistor connected in series with the source/drain path of the MOS transistor.

12. The disk drive system of claim 11, wherein the controlling means comprises:

a first comparator for comparing the load voltage and a reference voltage;

a second comparator for comparing the voltage across the resistor and a current limit threshold voltage; and a logic circuit generating a switch control signal responsive to the first comparator and to the second comparator.

13. The disk drive system of claim 12, further comprising a band-gap voltage reference circuit for generating the reference voltage and the current limit threshold voltage.

14. A load voltage generating circuit according to claim 9, wherein the voltage comparator and the current comparator are operational amplifiers.

15. A method of producing an increased load voltage for powering a load with a BEMF of a coasting polyphase motor in response to an interruption in the primary power supply to the motor, the method comprising the steps of:

(a) generating a current in the stator windings of the coasting polyphase motor by closing a control switch connected in parallel with drive circuitry for stator windings of the motor, so that the generated current results from BEMF in the stator windings due to the rotation of a coasting rotor;

(b) opening the control switch responsive to the current in the stator windings reaching a predetermined level, so that the load voltage across a capacitor is boosted by the generated current in response to the opening of the control switch; and (c) repeating steps (a) and (b) until the completion of the operation of the load.

16. The method according to claim 15, wherein the load is a retracting apparatus for retracting a read-write head assembly before a rotational speed of the spindle and attached disk is substantially reduced.

17. The method according to claim 16, wherein braking of the spindle motor is accomplished after the read-write head assembly is retracted.

\* \* \* \* \*